(12) United States Patent
Lee

(10) Patent No.: US 6,644,839 B2
(45) Date of Patent: Nov. 11, 2003

(54) LIGHTED WHEEL RIM SYSTEM

(76) Inventor: Dennis R. Lee, 807 Dandelion Dr., Mesquite, TX (US) 75149

( * ) Notice: Subject to any disclaimer, the term of this patent is extended or adjusted under 35 U.S.C. 154(b) by 0 days.

(21) Appl. No.: 10/093,057

(22) Filed: Mar. 8, 2002

(65) Prior Publication Data
US 2003/0169595 A1 Sep. 11, 2003

(51) Int. Cl.[7] .................................................. B60Q 1/00
(52) U.S. Cl. ..................................................... 362/500
(58) Field of Search ................................. 362/500, 510, 362/511, 541, 543, 545, 581, 554

(56) References Cited

U.S. PATENT DOCUMENTS

| | | | |
|---|---|---|---|
| 4,430,692 A | 2/1984 | Papadakis | 362/500 |
| 4,782,431 A | 11/1988 | Park | 362/161 |
| 4,881,153 A | 11/1989 | Scott | 362/500 |
| 4,893,877 A | 1/1990 | Powell et al. | 362/35 |
| 5,016,144 A | 5/1991 | DiMaggio | 362/35 |
| 5,040,100 A | 8/1991 | Di Gaetano | 362/506 |
| 5,465,194 A | 11/1995 | Currie | 362/464 |
| 5,495,400 A * | 2/1996 | Currie | 362/551 |
| 5,530,630 A | 6/1996 | Williams | 362/500 |
| 5,558,426 A | 9/1996 | Cabanatan et al. | 362/500 |
| 5,800,035 A | 9/1998 | Aichele | 362/31 |
| 6,168,301 B1 | 1/2001 | Martinez et al. | 362/500 |
| 6,322,237 B1 * | 11/2001 | Lee | 362/500 |

* cited by examiner

Primary Examiner—Sandra O'Shea
Assistant Examiner—Bertraud Zeade
(74) Attorney, Agent, or Firm—Richard C. Litman

(57) ABSTRACT

A lighted wheel rim system illuminates the wheel of a vehicle by projecting visible light through decorative openings disposed in the rim of a tire. The lighted wheel rim system includes a light unit which is stimulating and aesthetically pleasing to the human eye. The lighted wheel rim system has two major parts, including a light housing assembly and a lighting assembly. Brackets and fasteners are configured to connect the light housing assembly to the brake rotor splash guards or brake shield of a vehicle. The brackets are dimensioned to correspond to the outer curvature, shape, and size of the brake shield and to hold the light housing assembly in spaced apart relation therefrom. Each wheel of a vehicle is configured with a ring light unit as an integrated electrical system.

19 Claims, 9 Drawing Sheets

LIGHTED WHEEL RIM SYSTEM

CROSS-REFERENCE TO RELATED APPLICATION

This application is related to U.S. patent application Ser. No. 09/617,914, filed Jul. 17, 2000, now U.S. Pat. No. 6,322,237 B1, the disclosure of which is hereby incorporated by reference.

BACKGROUND OF THE INVENTION

1. Field of the Invention

The present invention relates generally to automotive accessories. More specifically, the invention is an apparatus for illuminating the wheels of a vehicle.

2. Description of the Related Art

Numerous systems have been developed for providing improved visualization of the wheels of vehicles at night. Some of the most significant advances in the art have centered around the development of passive reflectors and parking lights. However, none of the references herein described provides a lighting apparatus which is adapted for mounting on the brake shield of a wheel.

The related art is represented by the following patents of interest.

U.S. Pat. No. 4,430,692, issued on Feb. 7, 1984 to Alexandros M. Papadakis et al., describes an automotive vehicle wheel having at least one rotatable wheel that includes a light source mounted to the vehicle, light transmission means operatively associated with the light source, and reflective surface means for reflecting light to produce a visual light illumination effect. Papadakis et al. does not suggest a lighted wheel rim system according to the claimed invention.

U.S. Pat. No. 4,782,431, issued on Nov. 1, 1988 to Seung M. Park, describes a lighting apparatus for mounting on vehicle wheels. The apparatus includes a light unit fixed on a wheel member and a miniature magnetometer characterized by its rotor being coaxial with the wheel to produce power by rotation following the rotation of wheels. Park does not suggest a lighted wheel rim system according to the claimed invention.

U.S. Pat. No. 4,881,153, issued on Nov. 14, 1989 to Russel E. Scott, describes a lighting system for vehicle wheels and includes a disk assembly which facilitates the electrical power source of a vehicle. Further, the lighting system includes a mounting system for mounting a disk to the lugs of the vehicle on the inside of the wheel. The disk includes first and second coaxially mounted electrically conductive rings which remain in continuous electrical contact when rotated relative to each other. The mounting system includes an electrically conductive portion and an insulator portion which electrically separates the mounting assembly from the first and second rings. The electrically conductive portion of the mounting means are used to electrically ground the rotating lights. Scott does not suggest a lighted wheel rim system according to the claimed invention.

U.S. Pat. No. 4,893,877, issued on Jan. 16, 1990 to Manual Powell, describes a lighted hubcap including a cap body that has an outboard side and an opposing inboard side. When the cap body is secured to the wheel of a passenger vehicle, the outboard side faces away from the vehicle. At least one light emitter is incorporated in the cap body so that it emits light from the outboard side of the cap body when energized. A permanent magnet assembly is pivotally secured to the cap body and weighted so that the permanent magnet assembly is in a generally fixed orientation with respect to the passenger vehicle. Electrically conducting windings are secured to the inboard side concentrically about the permanent magnet assembly and are connected to the light emitters. The windings are in magnetic flux coupling relationship with the permanent magnet assembly so that, upon rotation of the wheel, alternating current is generated in the winding for energizing the light emitters. Powell does not suggest a lighted wheel rim system according to the claimed invention.

U.S. Pat. No. 5,016,144, issued on May 14, 1991 to Darryl DiMaggio, describes an illuminating wheel cover including a momentary rotating mercury switch which gathers mercury during rotation and causes a momentary electrical connection to illuminate light emitting diodes arranged to create an illusionary effect. DiMaggio does not suggest a lighted wheel rim system according to the claimed invention.

U.S. Pat. No. 5,040,100, issued on Aug. 13, 1991 to Ronald Di Gaentano, describes a vehicle wheel well illumination device including a pair of light sources and a resilient rod interconnecting the light sources in a spaced apart configuration. The resilient rod is capable of elastic deformation under a manual bending effort to bring the rod into a condition suitable to enter a wheel well of a vehicle. Discontinuance of the bending effort causes the rod to partially recover its original form, frictionally engaging the wheel well and causing it to be thereby retained in place. Di Gaentano does not suggest a lighted wheel rim system according to the claimed invention.

U.S. Pat. No. 5,465,194, issued on Nov. 7, 1995 to Joseph E. Currie, describes an optical fiber illumination device. Currie does not suggest a lighted wheel rim system according to the claimed invention.

U.S. Pat. No. 5,530,630, issued on Jun. 25, 1996 to Harry L. Williams, Jr., describes an apparatus for lighting a wheel rotatably mounted on a frame of a vehicle including a source of current mounted on the frame of the vehicle, a commutator mounted to the wheel for rotation therewith, at least one light bulb, and a brush electrically connected to the frame adjacent the commutator. The brush has a flow of current from the battery to the commutator so as to power the light bulb. The apparatus is adaptable to cars, motorcycles, and semi-truck wheels, whether the wheels are mounted as singles or as duals. Williams, Jr. does not suggest a lighted wheel rim system according to the claimed invention.

U.S. Pat. No. 5,558,426, issued on Sep. 24, 1996 to Dennis C. Cabanatan et al., describes a set of automotive wheel lights for illuminating the wheels of an automobile in operation at night that include a plurality of lights, one for each wheel, each mounted on the frame of the automobile near a respective wheel. Each light includes a light bulb in a socket, held fixed at its lighting position at the lighting end of a rigid arm bent towards the wheel of the automobile and mounted onto and extending from the automobile. The light bulb is encased in a protective light bulb cover and lens in one which directs illumination onto the entire outside surface of the wheel. The light bulb in the socket is electrically connected to the power source of the automobile sharing a single switching control with the parking lights and headlights of the automobile. Cabanatan et al. does not suggest a lighted wheel rim system according to the claimed invention.

U.S. Pat. No. 5,800,035, issued on Sep. 1, 1998 to William E. Aichele, describes a wheel lighting apparatus for use on a vehicle wheel rotatably mounted on a vehicle body. The wheel lighting apparatus includes a chamber mounted to the wheel with a portion of the chamber formed from material which permits the transmission of light therethrough. A light transmitting member is provided for transmitting light from the light source to outside the chamber. The light transmitting member also has a light conducting portion and a light emitting surface. The light received by the light receiving surface travels through the light received by the light conducting portion to the light emitting surface where the light is emitted in a predetermined pattern adjacent the wheel. An electrical connector device is provided to connect a power source mounted on the vehicle body to the light source. The electrical connector device includes a pair of circular rings of electrically conductive material mounted to the wheel and electrically insulated therefrom. The electrical connector device also includes a pair of contactors mounted to the body, each having an electrically conductive, movable contact portion in electrical contact with their respective circular rings. A pair of electrical connectors are provided for electrically connecting the terminals of the power source to the light source through the flexible contact portion of flexible connectors and their respective rings. Aichele does not suggest a lighted wheel rim system according to the claimed invention.

U.S. Pat. No. 6,168,301, issued on Jan. 2, 2001 to Marvin R. Martinez et al., describes a system for illuminating a wheel on a vehicle. Martinez does not suggest a lighted wheel rim system according to the claimed invention.

None of the above inventions and patents, taken either singularly or in combination, is seen to describe the instant invention as claimed. Thus an improved lighted wheel rim system solving the aforementioned problems is desired.

SUMMARY OF THE INVENTION

The lighted wheel rim system according to the invention includes a device that illuminates a wheel of a vehicle by projecting visible light, preferably through the decorative openings incorporated into the rim of a tire. The present invention provides a significant improvement in that it remains essentially stationary with respect to the wheel from damaging exterior forces. An additional advantage is that the invention includes no moving parts, an important feature further insuring its stability and durability. The lighted wheel rim system may be installed by the manufacturer in the factory or retrofitted and is preferably mounted on the wheel and inboard of the brake rotor of the vehicle. The lighted wheel rim system includes a light source, or a light transmitting or reflecting member that forms an arrangement which is stimulating and aesthetically pleasing to the human eye.

The lighted wheel rim system includes two major parts, including a light housing assembly and a lighting assembly. The light unit includes a light source, or a light transmitting or reflecting member. Brackets are configured are configured to mount in the invention to the brake rotor splash guards or brake shields of a vehicle. The brackets are dimensioned to correspond to the outer curvature, shape, and size of the brake shield and to hold the light housing assembly in spaced apart relation therefrom. The light housing assembly also includes a circular body having a hollow cross section defining an interior passageway inside of which the electrical conductive element of the lighting assembly are contained. The lighted wheel rim may further have a light cover for covering the light. An electrical conductor is provided to electrically connect a power source to the lighted wheel rim system. An on/off switch is also provided to control the state of the electrical circuit in order to turn the lights on or off simultaneously.

Accordingly, it is a principal aspect of the invention to provide a lighted wheel rim system which creates an effective and aesthetically pleasing light display.

It is another aspect of the invention to provide a lighted wheel rim system adapted for fastening to the brake shield of a vehicle.

It is a further aspect of the invention to provide a lighted wheel rim system which may be readily mounted and dismounted from vehicles.

Still another aspect of the invention is to provide a lighted wheel rim system, which may be rigidly mounted to a vehicle, is rigid enough to withstand external forces and vibrations, and is sturdy and durable.

It is an aspect of the invention to provide improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a lighted wheel rim system for illuminating the wheel of a vehicle.

Figure 1:
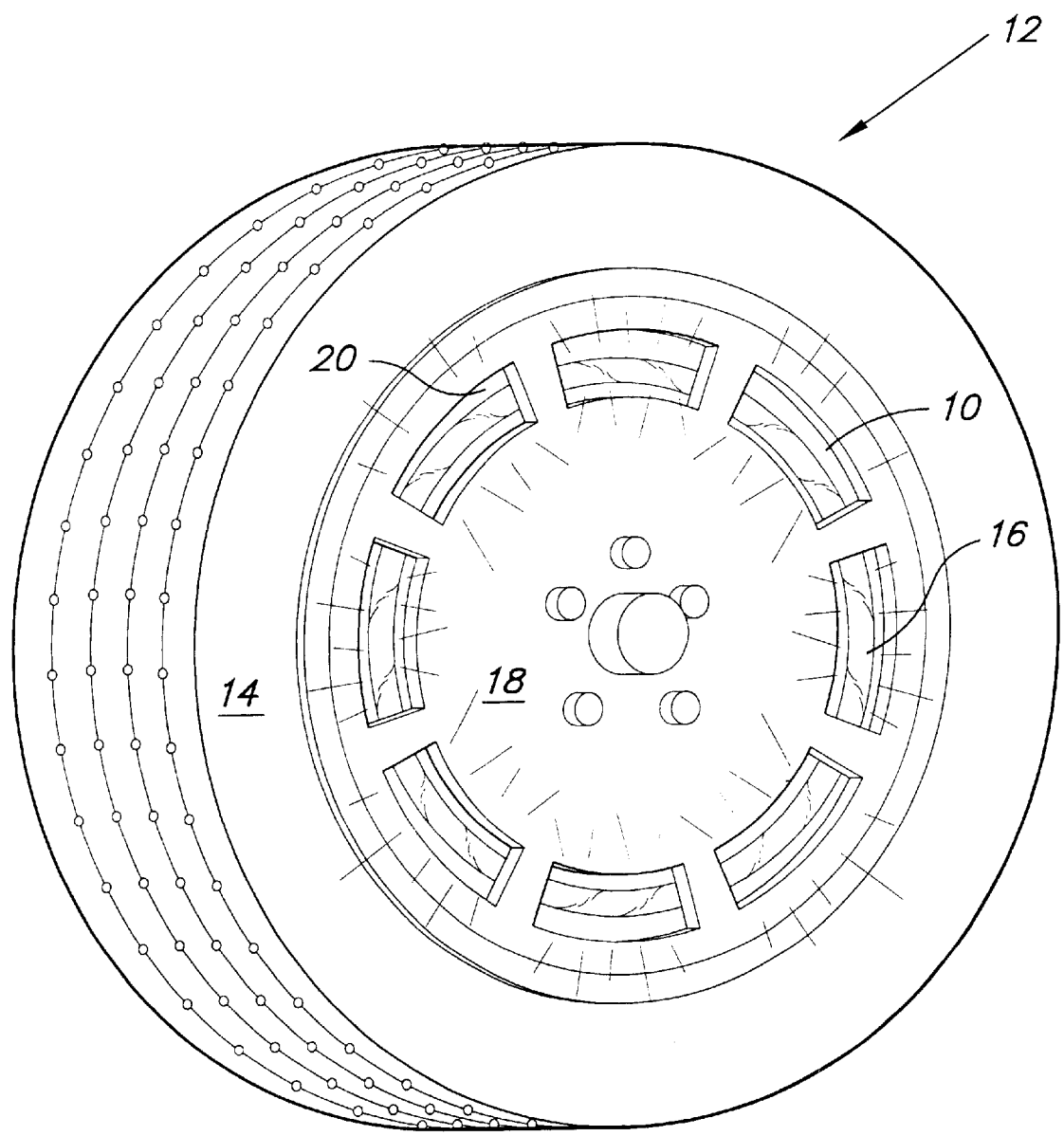
FIG. 1 is an environmental, perspective view of the lighted wheel rim system, according to the present invention.

As diagrammatically illustrated in FIG. 1, an environmental view is depicted in which the lighted wheel rim system 10 has been mounted or installed on the wheel 12 and inboard of the brake rotor of a vehicle. The invention includes a light source, or a light transmitting or reflective member that is stimulating and aesthetically pleasing to the eye. The lighted wheel rim system 10 may be installed by the manufacturer in the factory or retrofitted. However, because the lighted wheel rim system 10 is designed to be attached to the brake shield of a vehicle, the invention may be sold in a variety of ways including as single units, or in kits, such as with a particular model tire rim or tire and tire rim assembly, or even as an accessory in a brake conversion kit. Alternatively, the lighted wheel rim may be mounted on the backing plate for drum brakes.

The importance of decorative accoutrements and embellishments for vehicles is becoming increasingly evident. From 1990 to 1996, the sale of automotive accessories and performance equipment increased by forty-five percent to eighteen billion dollars. Many Americans commonly report that they spend more time in their cars and trucks than in their living rooms, and so believe that their vehicles should be appropriately personalized. One of the most popular forms of ornamentation is custom designed wheels, chrome wheels being a good example. Additionally, over the past few years, the popularity of the use of neon and other lighting elements has skyrocketed—from strobe lights and neon license plates to illuminated cargo areas and speakers, neon and similar automotive accessories have become a major fashion. D.O.T. studies have shown that side marker lamps on vehicles are associated with a significant decrease in the incident of accidents. Thus, a significant market exists for a rugged, durable, and practical accessory for providing an aesthetically pleasing illumination effect for the wheels of a vehicle, as well as for helping to insure the safety of drivers.

In the preferred manner of use of the invention when mounted on a wheel 12, the area between the central portion 18 of the rim and the tire 14 will be provided with a plurality of substantially arcuate trapezoidal openings, generally 20, through which the light unit 16 of the lighted wheel rim system 10 may be visually distinguished by an observer, as seen in FIG. 1.

In certain kinds or models of wheels, these openings 20 may follow a specific decorative pattern or configuration. This specification encompasses patterns of the light unit 16 corresponding to or matching with the various arrangements and designs of the openings 20 found in conventional tire rims, as well corresponding or parallel to the openings 20 defined by the plurality of spokes typically disposed axially outward from the central portions of conventional tire rims.

In short, the lighted wheel rim system 10 encompasses and is inclusive of any and all designs or patterns for the spatial configurations of the light unit 16 for the visual stimulation of an onlooker. It should, therefore, be understood that a tire rim used concomitantly with the invention, as well as any covering for the light unit 16, should include at least one device for transmitting light therethrough. The light transmitting device may be any structure or substance, including transparent materials, as well as structures having an opening or series or arrangements of openings, inclusive of openings having lenses, screens, and transparent elements disposed therein, openings containing light reflective and opaque elements, light conducting elements such as optical fibers, neon wires, light wires, or any other device or apparatus for transmitting light generated by the lighted wheel rim system 10 or the light unit 16 thereof. The light transmitting device may also have a light emitting surface, the light received by the light transmitting device traveling therethrough to the light emitting surface where the light is emitted in a predetermined pattern adjacent the wheel.

The specification also embraces any kinds of illumination elements, including conventional light bulbs, incandescent bulbs, fluorescent bulbs, halogen bulbs, metal halide bulbs, mercury bulbs, high pressure sodium bulbs, krypton bulbs, xenon bulbs, full-spectrum bulbs, black light bulbs, LEDs, vibration absorbing mini bulbs, optical fiber elements, neon wire elements, light wire elements, as well as electrical configurations for powering or supplying power to those illumination elements. Light wires are well known in the art and include strands of plural illumination devices, such as LEDs or the like, mounted in a flexible mounting, preferably formed of a flexible plastic, such as polypropylene, acetal, Nylon, PVC tubing, or the like, having appropriate rigidity, yet sufficient spring-like memory to function well for the invention.

Furthermore, the lighted wheel rim system 10 may have light units which flash, blink, or flicker according to any pattern the user may desire, as well as the appropriate electronic elements to execute such patterns. The present invention may also include safety lights to insure safe operation of the vehicle under low visibility conditions, helping vehicle drivers overcome their blind spots when driving.

The prior art demonstrates that various attempts have been made to illuminate the wheels of vehicles. These inventions are typically designed to be placed on rotatably mounted wheels and, thus, are subject to breakdown secondary to the destructive effects of vibration, rotation, and material degradation on the road. The present invention provides a significant improvement in that it remains stationary with respect to the wheel and is largely protected by the body of the wheel from damaging exterior forces. This advantage is further augmented by the fact that the invention includes no moving parts, an important feature insuring its stability and durability, especially on bumpy terrain.

Figure 3:
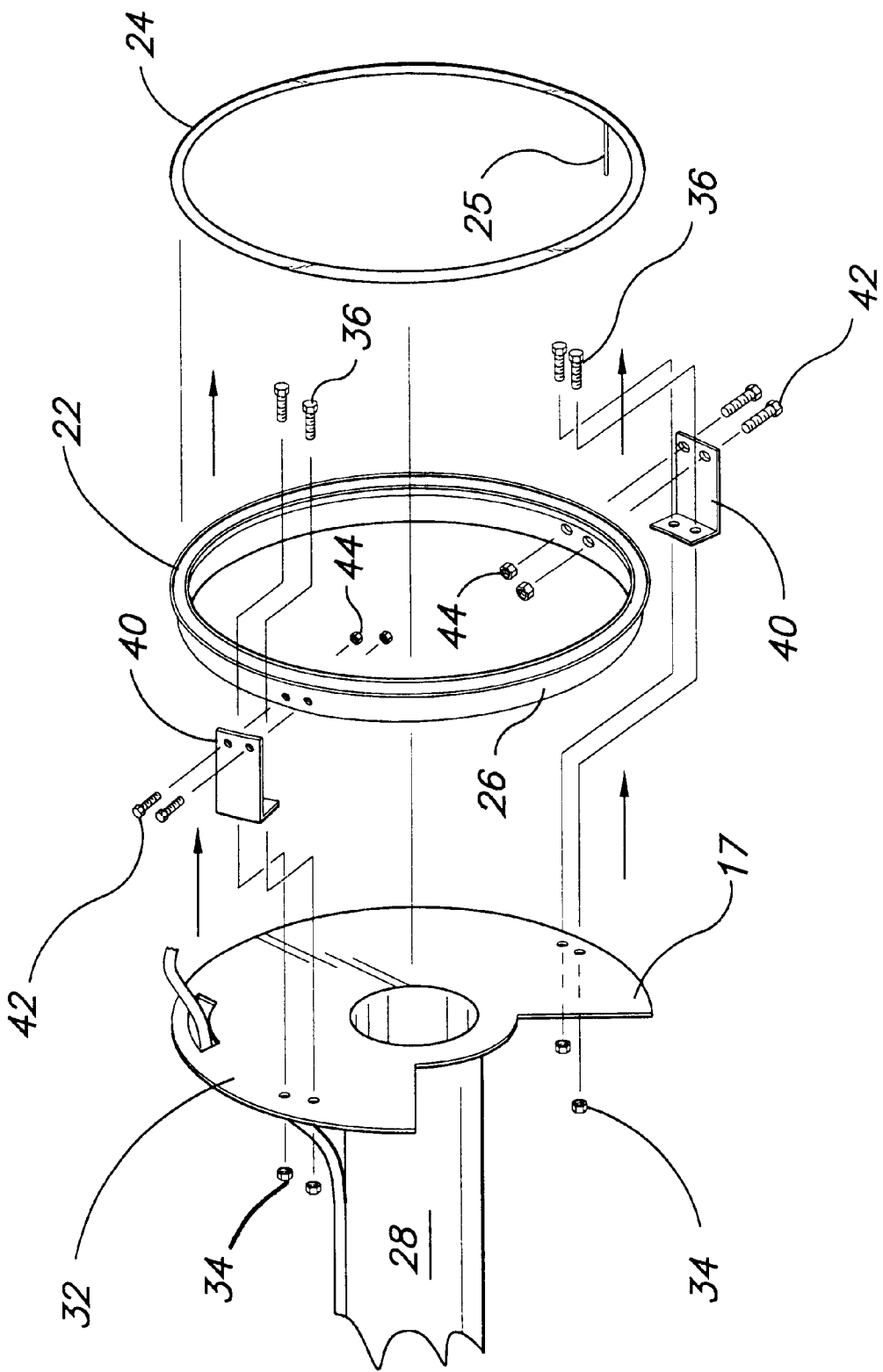
FIG. 3 is a perspective view of the first embodiment of the lighted wheel rim system, showing the manner of attachment of the lighting circuitry assembly to the rim, according to the present invention.

Turning briefly to FIG. 3, it can be seen that the two major parts of one embodiment of the lighted wheel rim system 10 are a light housing assembly 22 and a light unit 24. The light unit 24 is one of an optical fiber, a neon wire, or a light wire. The light unit 24 is easily wound into a circularly-shaped band for positioning in a groove of the light housing assembly 22. The light unit 24 is removably attached to the light housing assembly 22. In various embodiments of the invention, a light unit 24 may be replaced by direct insertion into the light housing assembly 22 or after removal of a light unit 24 therefrom.

Figure 2:
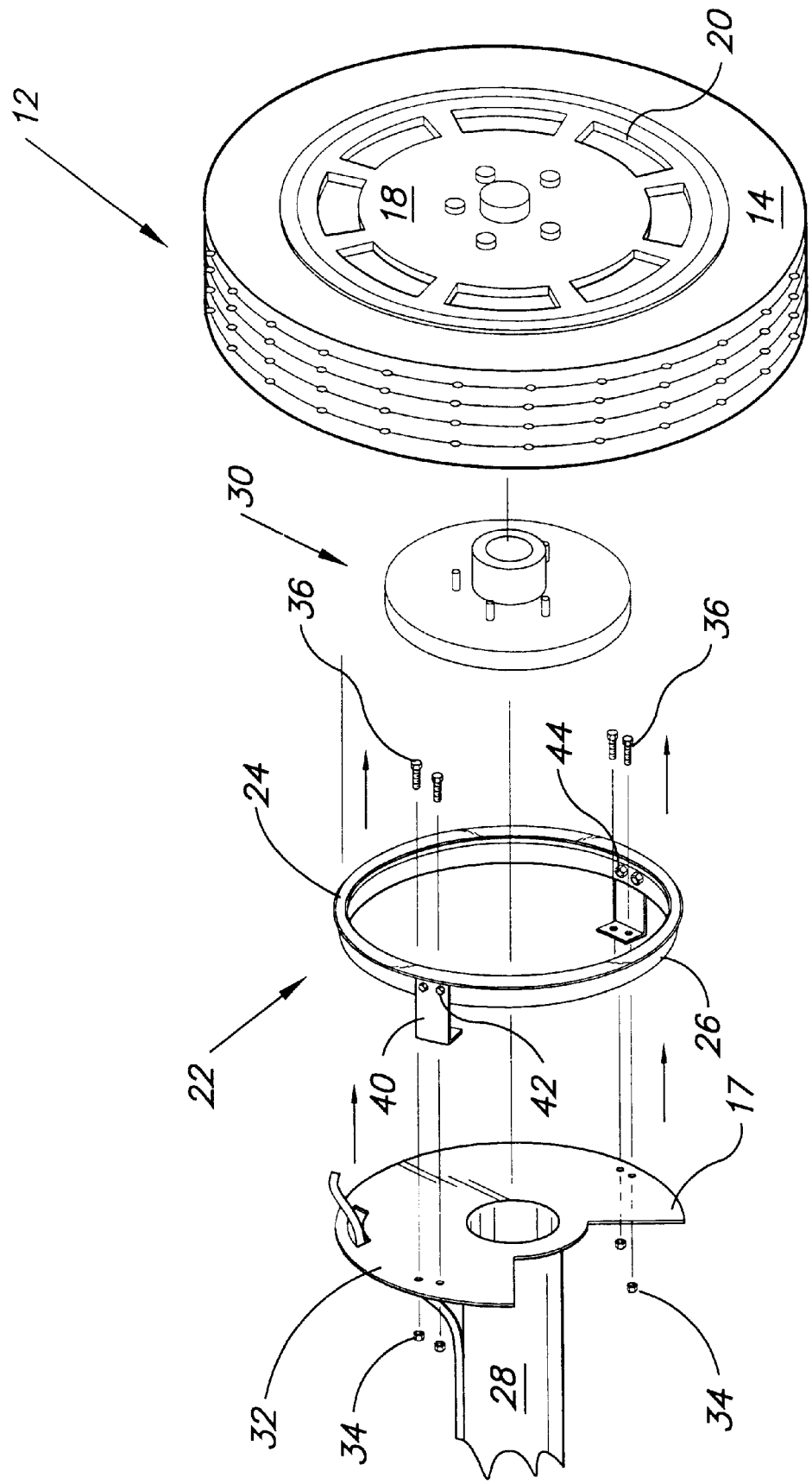
FIG. 2 is a perspective view of a first embodiment of the lighted wheel rim system, showing the manner of attachment to a tire, according to the invention.

Referring to FIG. 2, the light housing assembly 22 is specially designed for mounting to the brake rotor splash guards (disk brake guards) 17 or the backing plate for the drum brakes of a vehicle and may be suitably shaped, sized, and dimensioned to fit over any such brake shield 17 or backing plate commonly known in the art and commercially available. In an alternative embodiment of the invention, the lighted wheel rim system 10 may be integral with the brake shield 17. The light housing assembly 22 may further include any durable and suitably strong substance, including steel, polymeric material, and transparent material. Obviously, different types of wheels 12 including different constructions, configurations, and including different materials could be utilized.

In FIG. 2, the basic relationship of lighted wheel rim system 10 to the various subcomponents of the brake assembly and tire 14 can be discerned more clearly. When mounted, it can be appreciated that light housing assembly 22 is fastened onto brake shield 17 conventionally attached to axle 28. The brake/rotor assembly 30 is mounted between tire 14 and axle 28, also in a conventional manner. Another advantage of the invention is that it allows for easy attachment of the device to the wheel of a vehicle and should further help to protect the brakes from dirt and dust.

Turning again to FIG. 3, brackets 40 are used to attach light housing assembly 22 to brake shield 17. Brackets 40 each define first and second plates with spaced apart apertures. One of the plates is configured to receive fasteners, such as mounting bolts 36, to fasten to brake shield 17 via mounting nuts 34. The other plate is configured to receive fasteners, such as mounting bolts 42, to fasten to light housing assembly 22 via mounting nuts 44.

It should be understood that this specification covers brackets 40 of any shape, size, and dimension, for fastening to brake shields 17 of assorted models. Furthermore, these brackets 40 are removable from the light housing assembly 22 and may be adjustable to more fully cooperate with the brake shields 17.

It should also be understood that this specification embraces any fasteners by which brackets 40 may be removably attachable or integral with their respective support surfaces, especially those of light housing assembly 22 and brake shields 17, as well as any material components, structures, and assemblies allowing brackets 40 to accommodate to or be adjustably received by brake shield 17 or backing plate or to be suitably adjusted with respect to light housing assembly 22. Also, any kind of brake shield 17 or backing plate may be used, including brake shields 17 with or without apertures for receiving therethrough a cord supplying power to light unit 24.

Figure 4:
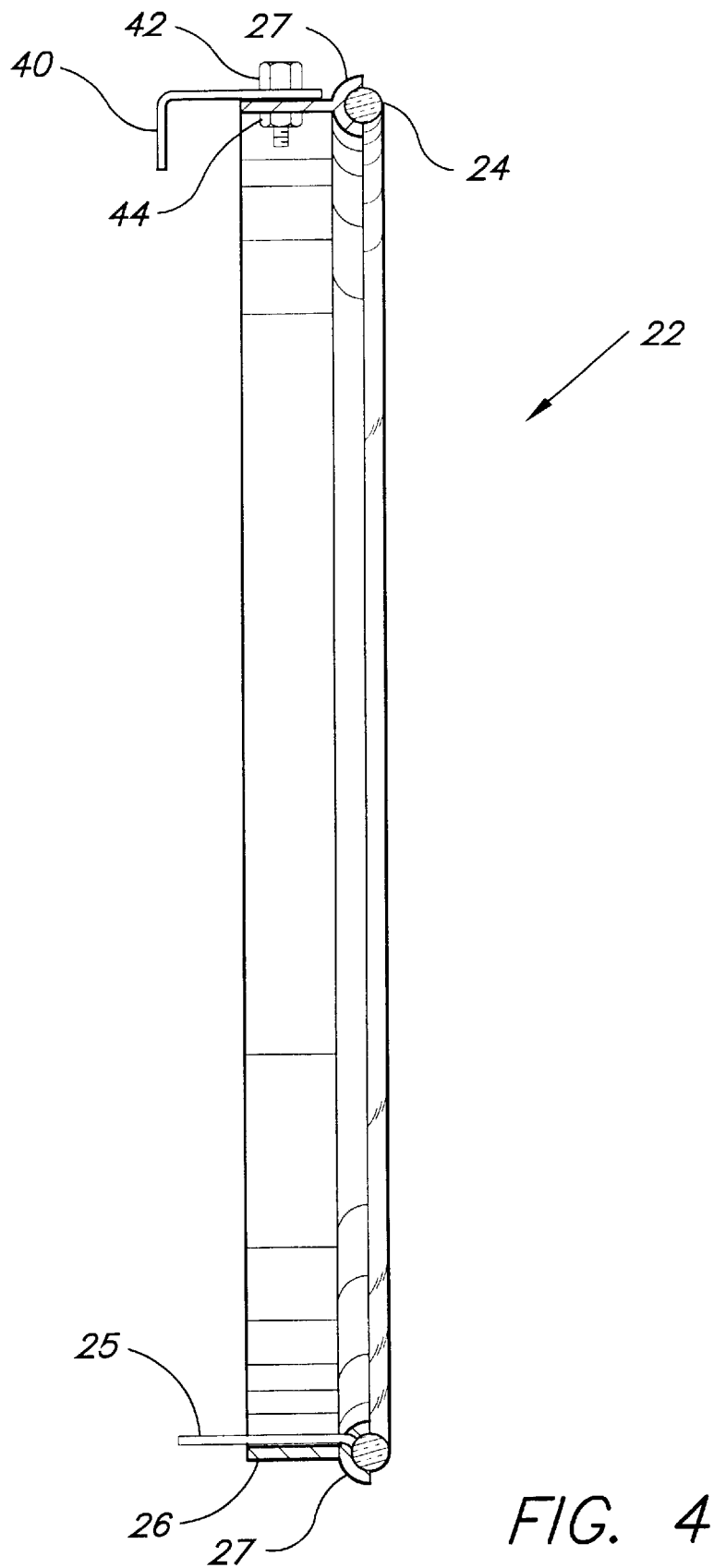
FIG. 4 is a cross-sectional view of the first embodiment of the lighted wheel rim system.

FIG. 4 illustrates a cross-sectional view of the lighted wheel rim system shown in FIGS. 2 and 3. The light unit 24 fits frictionally in groove 27 of the light housing assembly 27 and includes an extending conductive wire 25 to electrically connect the light unit to a power source. Bracket 40 is fastened to element 26 of light housing assembly 22.

Figure 5:
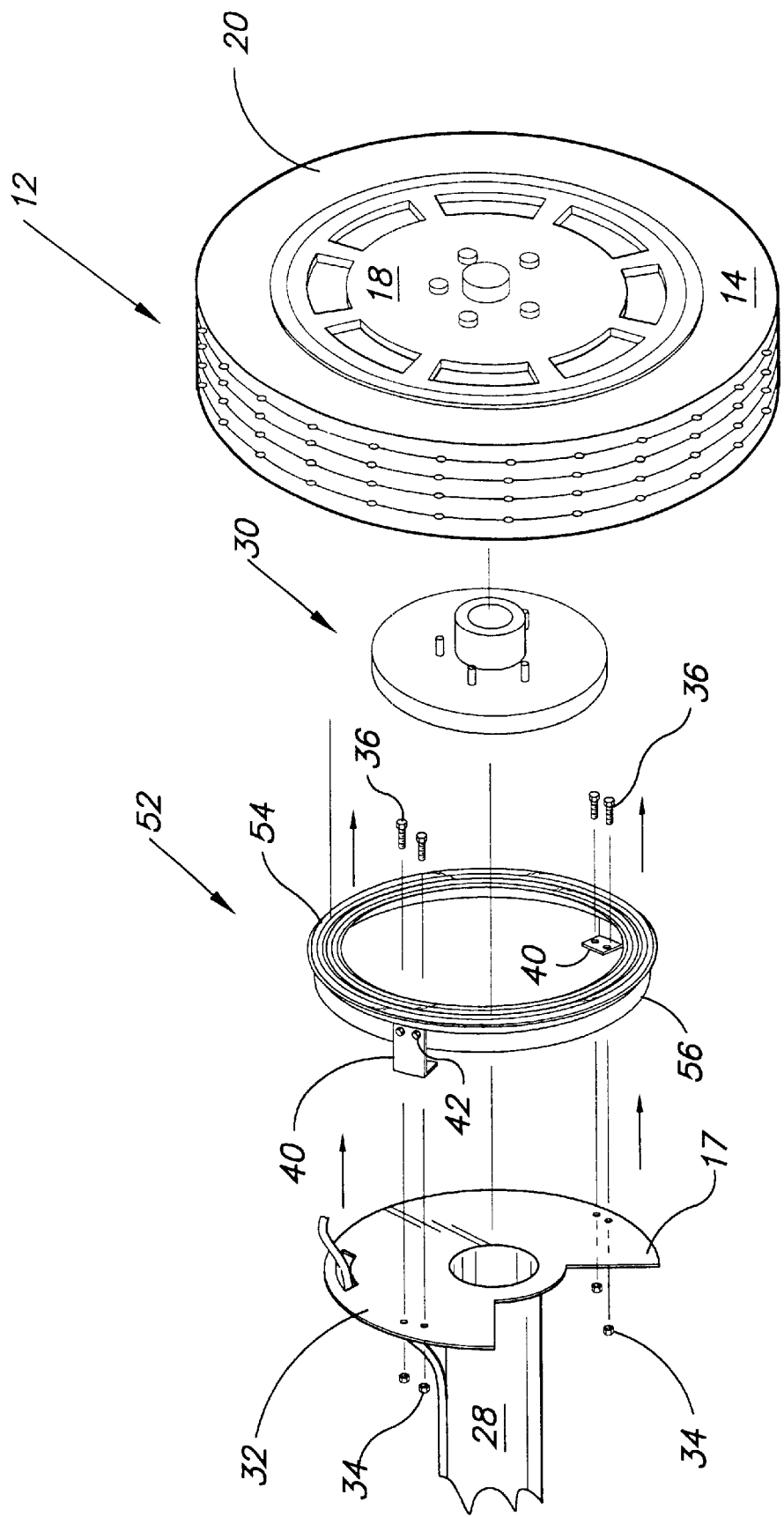
FIG. 5 is a perspective view of a second embodiment of the lighted wheel rim system, showing the manner of attachment of the lighting circuitry assembly to the rim, according to the present invention.
Figure 6:
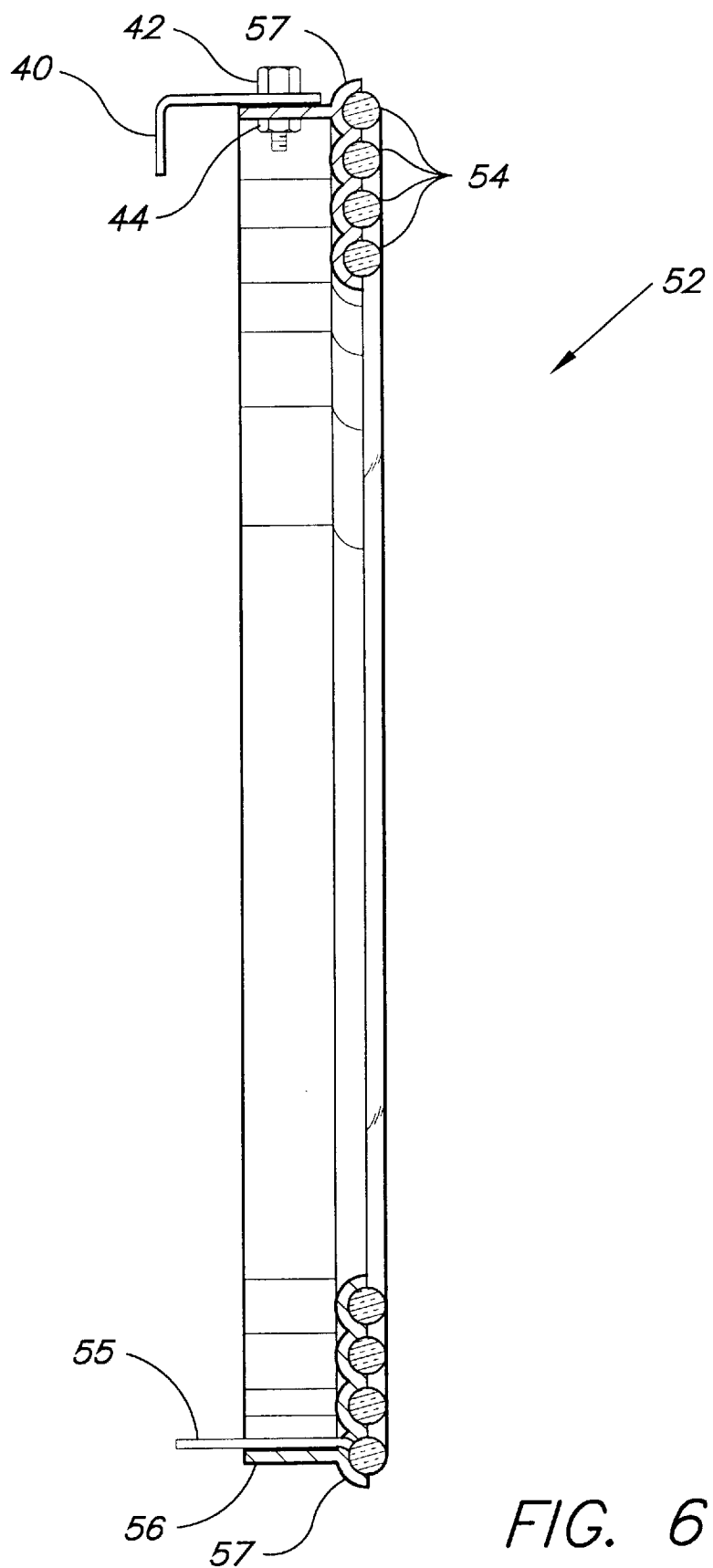
FIG. 6 is a cross-sectional view of the second embodiment of the lighted wheel rim system.

FIGS. 5 and 6 illustrate an embodiment of the lighted rim system that is substantially the same as the embodiment of the lighted rim system shown in FIGS. 2–4. In this example, light housing assembly 52 is configured to mount four light units 54. As shown in FIG. 6, light units 54 fit frictionally in grooves 57 of light housing assembly 52 and include extending conductive wire 55 to electrically connect light units 54 to a power source. Bracket 40 is fastened to element 56 of light housing assembly 52.

As illustrated in FIGS. 3 and 5, light units 24 and 54 are electrically connected to a source of power. Light units 24 and 54 develop into a common cord, which preferably passes through an aperture disposed through brake shield 17. It should be emphasized again that the invention may include any arrangement for supplying power to the lighted rim assembly.

Figure 7:
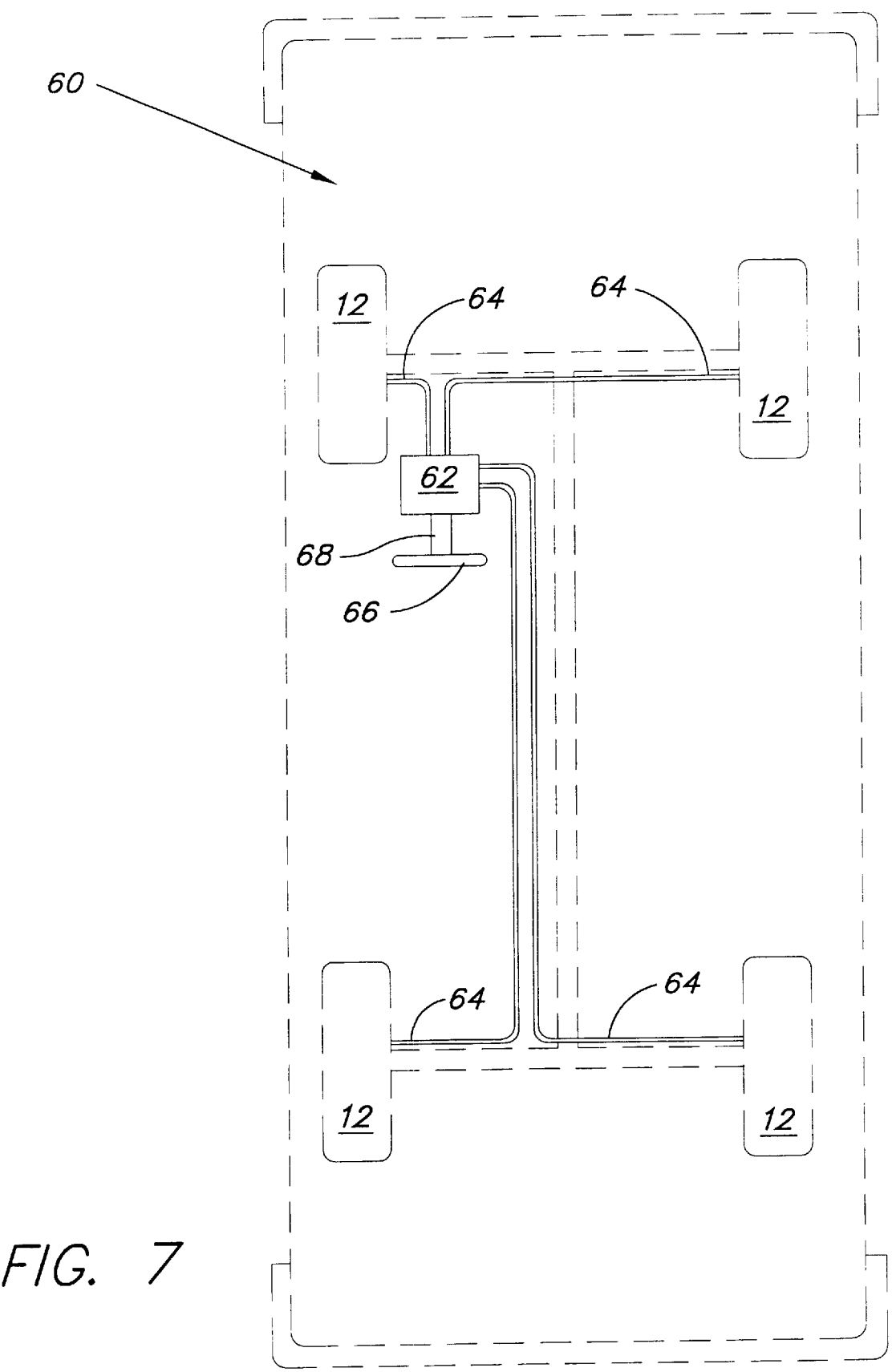
FIG. 7 is a diagrammatic view of the electrical system of the lighted wheel rim system, according to the invention.

FIG. 7 illustrates a preferred embodiment of the electrical circuitry 60 of the present invention. A power source 62, including but not limited to a conventional vehicle battery, a generator, or the like, is mounted so as to be stationary with respect to the frame of the vehicle. Power source 62 supplies current when activated by central switch 66, and a lead line 68 extends from switch 66 to power source 62. Thus, a plurality or set of lighted wheel rim systems 10 in a particular vehicle may be interconnected into a single electrical network, powered by single energy source. Alternatively, each light in a particular lighted wheel rim system 10 may have its own independent power source. The on/off switch 66 is preferably provided to control the state of the electrical circuit 60 in order to turn on or off the lights simultaneously.

Figure 8A:
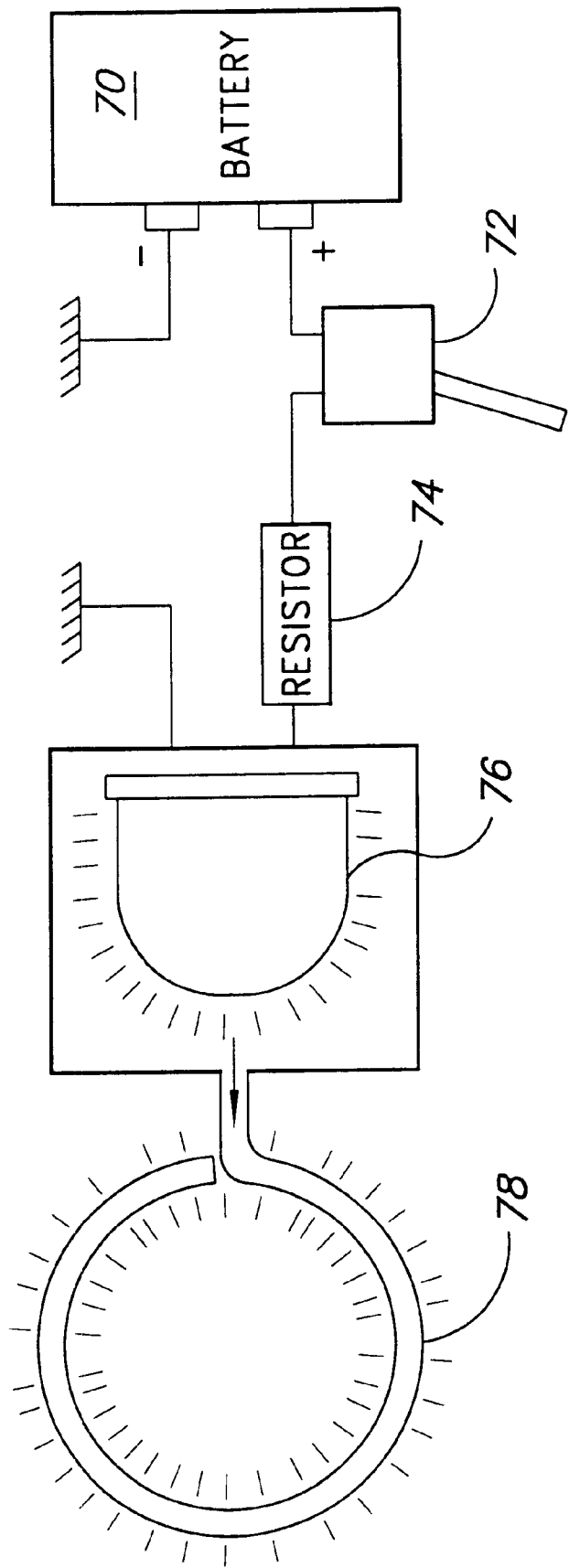
FIG. 8A is an electrical wiring diagram of an optical fiber lighted wheel rim system, according to the invention.

FIG. 8A illustrates a electrical wiring diagram for an optical fiber 78. Battery 70 provides electrical current through switch 72 and resistor 74 to power a small light, such as an LED 76, which illuminates optical fiber 78.

Figure 8B:
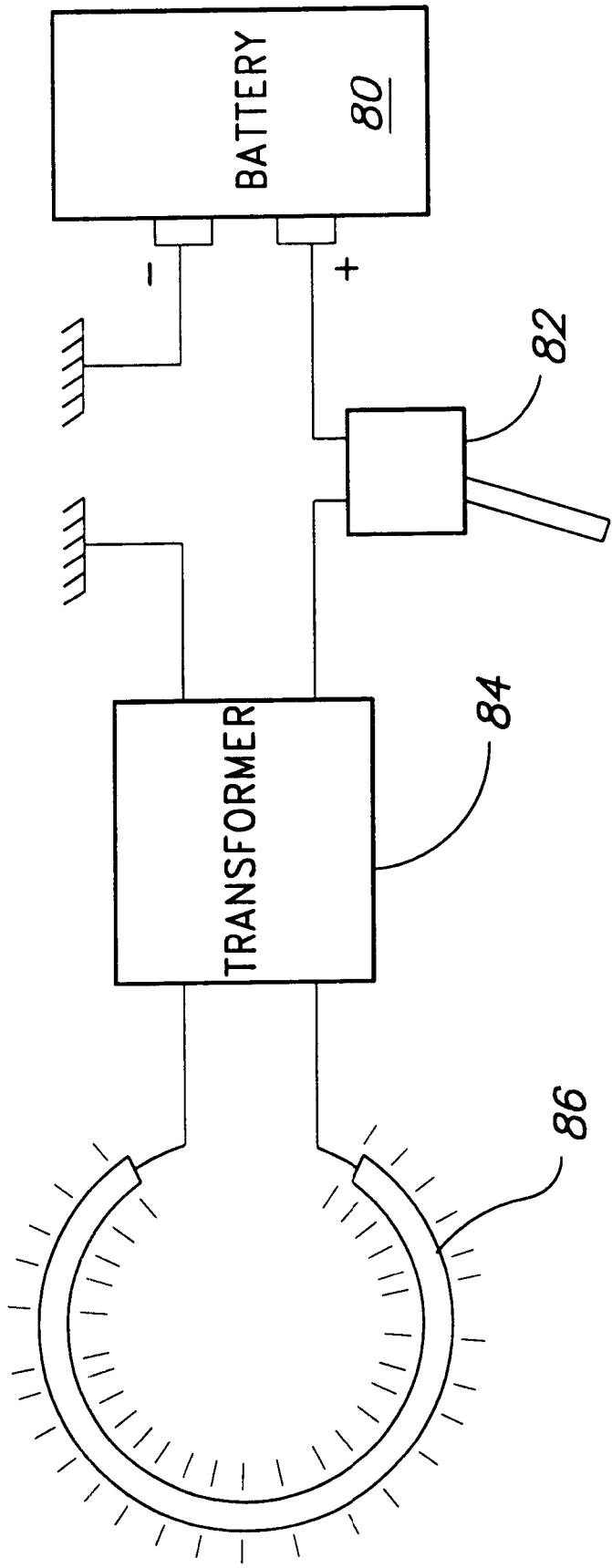
FIG. 8B is an electrical wiring diagram of a neon wire of the lighted wheel rim system, according to the invention.

FIG. 8B illustrates a electrical wiring diagram for a neon wire or light wire 86. Battery 80 provides electrical current through switch 82 and transformer 84 to power neon wire or light wire 86.

It is to be understood that the present invention is not limited to the embodiments described above, but encompasses any and all embodiments within the scope of the following claims.

I claim:

1. A lighting apparatus for mounting on a brake shield of a vehicle comprising:

a lighting assembly and at least one power source, said lighting assembly including at least one light unit and a respective electrical conductor for supplying electrical power from said power source to said at least one light unit;

a light housing assembly, said light housing assembly comprising a housing body, said housing body being removably fastened to the brake shield of the vehicle, wherein the light unit is selected from the group consisting of optical fibers, neon wires, and light wires.

2. The lighting apparatus of claim 1, wherein said electrical conductor comprises at least one wire.

3. The lighting apparatus of claim 1, wherein said housing body comprises at least one aperture for frictionally supporting said at least one light unit within said aperture.

4. The lighting apparatus of claim 1, wherein said lighting assembly is removably fastened to said light housing assembly.

5. The lighting apparatus of claim 1, further comprising at least one bracket and at least one fastener dimensioned and configured for removably connecting said light housing assembly to said brake shield.

6. The lighting apparatus of claim 1, wherein said apparatus further comprises a tire rim defining apertures to allow an observer to see said at least one light unit through said apertures when said tire rim and said lighting apparatus are mounted to a wheel of a vehicle.

7. The lighting apparatus of claim 1, wherein said apparatus further comprises a brake shield and a light cover for covering said at least one light unit.

8. The lighting apparatus of claim 7, wherein said brake shield comprises an aperture for receiving said electrical conductor therethrough.

9. A lighting apparatus for mounting on a brake shield of a vehicle comprising:

a substantially circular housing and at least one power source, said housing defining an interior passageway for containing a cord of at least one light of a light assembly, said cord for supplying electrical power to said at least one light from a power source;

said housing having at least one flange portion for mounting said housing to the brake shield of a wheel;

said apparatus further comprising at least one fastener for connecting said flange portion to said brake shield, wherein the light unit is selected from the group consisting of optical fibers, neon wires, and light wires.

10. The lighting apparatus of claim 9, wherein said housing comprises at least one aperture for receiving said at least one light of said light assembly and for frictionally supporting said at least one light within said aperture.

11. The lighting apparatus of claim 10, wherein said apparatus further comprises at least one switch for electrically activating said apparatus when connected to a power source and a light cover for covering said at least one light unit.

12. The lighting apparatus of claim 11, wherein said apparatus further comprises a brake shield, said lighting apparatus being adapted to be mounted to said brake shield.

13. The lighting apparatus of claim 12 wherein said brake shield comprises an aperture for receiving said cord therethrough.

14. The lighting apparatus of claim 13, wherein said apparatus further comprises a tire rim defining an aperture.

15. The lighting apparatus of claim 14, wherein said tire rim comprises light transmitting device configured to transmit light.

16. A lighting apparatus for automobiles comprising in combination with at least one tire and rim assembly:
   mounting on a brake shield of a vehicle comprising:
      a lighting assembly and at least one power source, said lighting assembly including at least one light unit and a respective electrical conductor for supplying electrical power to said at least one light unit from said power source;
      a light housing assembly, said light housing assembly comprising a housing body, said housing body being removably fastened to a brake shield of a vehicle;
      said housing body being hollow and adapted for containing said electrical conductor therein;
      said lighting assembly being fastened to said light housing assembly;
      said housing body including at least one aperture for frictionally supporting said at least one light unit within said aperture;
      said apparatus further comprising at least one fastener for connecting said housing body to said brake shield,
      wherein the light unit is selected from the group consisting of optical fibers, neon wires, and light wires.

17. The lighting apparatus of claim 16, wherein said apparatus further comprises a tire rim defining apertures to allow an observer to see said at least one light unit through said apertures when said tire rim and said lighting apparatus are mounted to a wheel of a vehicle.

18. The lighting apparatus of claim 17, wherein said apparatus further comprises an aperture for receiving said electrical conductor therethrough.

19. The lighting apparatus of claim 18, further comprising a switching device configured to switch on said at least one light unit, said at least one light unit being interconnected by a single circuit.

* * * * *